US005694186A

United States Patent [19]
Yanagawa et al.

[11] Patent Number: 5,694,186
[45] Date of Patent: Dec. 2, 1997

[54] COLOR LIQUID CRYSTAL DISPLAY DEVICE HAVING SPECIAL RELATIONSHIP BETWEEN ITS ISOCHROMATIC VIEWING ANGLE AND HALF-BRIGHTNESS ANGLE

[75] Inventors: Kazuhiko Yanagawa; Masayuki Ohta; Kazuhiro Ogawa; Keiichiro Ashizawa, all of Mobara; Kiyoshige Kinukawa, Chousei-gun, all of Japan

[73] Assignee: Hitachi, Ltd., Tokyo, Japan

[21] Appl. No.: 709,869

[22] Filed: Sep. 10, 1996

[30] Foreign Application Priority Data

Sep. 11, 1995 [JP] Japan ................................ 7-232682

[51] Int. Cl.⁶ .......................................... G02F 1/1335
[52] U.S. Cl. .......................................... 349/106; 349/57
[58] Field of Search .......................... 349/106, 108, 349/57

[56] References Cited

U.S. PATENT DOCUMENTS

| | | | |
|---|---|---|---|
| 4,870,484 | 9/1989 | Sonehara | 349/106 |
| 4,929,061 | 5/1990 | Tominaga et al. | 349/106 |
| 4,946,259 | 8/1990 | Matino | 349/106 |
| 5,159,478 | 10/1992 | Akiyama et al. | 349/106 |
| 5,264,952 | 11/1993 | Fukutani et al. | 349/106 |
| 5,345,322 | 9/1994 | Fergason | 349/86 |
| 5,587,818 | 12/1996 | Lee | 349/106 |

FOREIGN PATENT DOCUMENTS 5-341270  12/1993  Japan .................................. 349/106

Primary Examiner—William L. Sikes
Assistant Examiner—Tiep H. Nguyen
Attorney, Agent, or Firm—Antonelli, Terry, Stout & Kraus LLP

[57] ABSTRACT

A color liquid crystal display device includes a liquid crystal display panel having color filters corresponding to primaries red, green and blue, and a backlight unit disposed behind the liquid crystal display panel. The color liquid crystal display device satisfies a relationship of an isochromatic viewing angle>a half-brightness angle, for at least one azimuthal viewing angle. The half-brightness angle is defined as an angle of a direction inclined with respect to a normal direction of the liquid crystal display panel in which brightness of light emerging from the backlight unit into the liquid crystal display panel becomes 50% of that in the normal direction. The isochromatic viewing angle is defined as a range of viewing angles from the normal direction wherein an absolute shift in an x coordinate of the primary red viewed at off-normal angles is not greater than 0.0314, an absolute shift in a y coordinate of the primary green viewed at off-normal angles is not greater than 0.0273, and an absolute shift in an x coordinate of the primary blue viewed at off-normal angles is not greater than 0.0177, with respect to corresponding coordinates of corresponding primary colors of the primaries red, green and blue viewed in the normal direction, on the CIE 1931 chromaticity diagram.

17 Claims, 15 Drawing Sheets

FIG. 3

| Display primary colors | Chromaticity coordinates | | $\|x-xw\|$ | $\|y-yw\|$ | $\sqrt{(x-xw)^2+(y-yw)^2}$ | Allowable color shift $\Delta C$ | |
|---|---|---|---|---|---|---|---|
| | x | y | | | | Criterion 1 $\sqrt{(x-xw)^2+(y-yw)^2}/8$ | Criterion 2 |
| white W' | 0.3014 | 0.3149 | — | — | — | — | — |
| red R' | 0.5528 | 0.3475 | 0.2514 | 0.0326 | 0.2535 | 0.0317 | $\|x-xw\|/8=0.0314$ |
| green G' | 0.3299 | 0.5335 | 0.0285 | 0.2186 | 0.2205 | 0.0276 | $\|y-yw\|/8=0.0273$ |
| blue B' | 0.1597 | 0.1488 | 0.1417 | 0.1661 | 0.2183 | 0.0273 | $\|x-xw\|/8=0.0177$ |

COLOR LIQUID CRYSTAL DISPLAY DEVICE HAVING SPECIAL RELATIONSHIP BETWEEN ITS ISOCHROMATIC VIEWING ANGLE AND HALF-BRIGHTNESS ANGLE

BACKGROUND OF THE INVENTION

The present invention relates to a color liquid crystal display device, and particularly to a so-called backlight type color liquid crystal display device.

The so-called backlight type color liquid crystal display device includes a backlight unit disposed behind a liquid crystal display panel having an envelope composed of a pair of transparent substrates sandwiching a liquid crystal layer therebetween.

The liquid crystal display panel is configured such that a large number of pixels capable of controlling the degree of light transmission through the liquid crystal layer independently of each other are arranged in a matrix to form a display area on a surface thereof in contact with the liquid crystal layer and illuminating light from the backlight unit enters the display area.

The color liquid crystal display device of the above configuration has an advantage of low power consumption; however, it is required to achieve compatibility of lower power consumption with higher picture quality, particularly, improved color uniformity.

The present inventors have studied the compatibility of the lower power consumption of a backlight unit with higher picture quality, particularly, improved color uniformity on the basis of a fact that a color in a display area changes when viewed at a large viewing angle, that is, at a large angle from normal to the liquid crystal display panel.

SUMMARY OF THE INVENTION

An object of the present invention is to provide a color liquid crystal display device capable of achieving the compatibility of reduction in power consumption with high picture quality, particularly, improved color uniformity.

To achieve the above object, according to a first aspect of the present invention, there is provided a color liquid crystal display device including:

a liquid crystal display panel including color filters corresponding to primary red, primary green and primary blue; and a backlight unit disposed behind the liquid crystal display panel;

wherein the color liquid crystal display device satisfies a relationship of an isochromatic viewing angle>a half-brightness angle, for at least one azimuthal viewing angle, where the half-brightness angle is defined as an angle of a direction inclined with respect to a normal direction of the liquid crystal display panel in which brightness of light emerging from the backlight unit into the liquid crystal display panel becomes 50% of that in the normal direction; and the isochromatic viewing angle is defined as a range of viewing angles from the normal direction, where an absolute shift in an x coordinate of the primary red viewed at off-normal angles is not greater than 0.0314, an absolute shift in a y coordinate of the primary green viewed at off-normal angles is not greater than 0.0273, and an absolute shift in an x coordinate of the primary blue viewed at off-normal angles is not greater than 0.0177, with respect to corresponding coordinates of corresponding primary colors of the primary red, the primary green and the primary blue viewed in said normal direction, on the CIE 1931 chromaticity diagram.

According to a second aspect of the present invention, there is provided a color liquid crystal display device including:

a liquid crystal display panel including color filters corresponding to primary red, primary green and primary blue; and a backlight unit disposed behind the liquid crystal display panel;

wherein the color liquid crystal display device satisfies a relationship of an isochromatic viewing angle>a half-brightness angle, for at least one azimuthal viewing angle, where the half-brightness angle is defined as an angle of a direction inclined with respect to a normal direction of the liquid crystal display panel in which brightness of light emerging from the backlight unit into the liquid crystal display panel becomes 50% of that in the normal direction; and the isochromatic viewing angle is defined as a range of viewing angles from the normal direction where a following relationship is satisfied:

$$\sqrt{(\Delta xr)^2 + (\Delta yr)^2} < 0.125 \times \sqrt{(xr - xw)^2 + (yr - yw)^2}$$

$$\sqrt{(\Delta xg)^2 + (\Delta yg)^2} < 0.125 \times \sqrt{(xg - xw)^2 + (yg - yw)^2}$$

$$\sqrt{(\Delta xb)^2 + (\Delta yb)^2} < 0.125 \times \sqrt{(xb - xw)^2 + (yb - yw)^2}$$

where $(xr, yr)$, $(xg, yg)$, $(xb, yb)$, and $(xw, yw)$ are chromaticity coordinates of the primary red, the primary green, the primary blue and white displayed on the liquid crystal panel, viewed in the normal direction respectively; $\Delta xr$, $\Delta yr$ are shifts in x, y coordinates of the primary red viewed at off-normal angles, respectively, $\Delta xg$, $\Delta yg$ are shifts in x, y coordinates of the primary green viewed at off-normal angles, respectively, and $\Delta xb$, $\Delta yb$ are shifts in x, y coordinates of the primary blue viewed at off-normal angles, respectively, with respect to corresponding coordinates of corresponding primary colors of the primary red, the primary green and the primary blue viewed in the normal direction, on the CIE 1931 chromaticity diagram.

According to a third aspect of the present invention, there is provided a color liquid crystal display device including:

a liquid crystal display panel including color filters corresponding to primary red, primary green and primary blue; and a backlight unit disposed behind the liquid crystal display panel;

wherein the liquid crystal display panel is provided with a display electrode and a reference electrode in each pixel region on a surface of a substrate on a side thereof in contact with a liquid crystal layer, an electric field substantially parallel to the substrate is generated in the liquid crystal layer by application of a voltage between the display electrode and the reference electrode, thereby modulating transmission of light through the liquid crystal layer, the display electrode being supplied with a video signal from a video signal line via a switching element in the pixel region adapted to be switched on by a scanning signal from a scanning signal line, and the reference electrode being supplied with a reference signal from a reference line, and wherein the color liquid crystal display device satisfies a relationship of an isochromatic viewing angle>a half-brightness angle, for at least one azimuthal viewing angle, where the half-brightness angle is defined as an angle of a direction inclined with respect to a normal direction of the liquid crystal display panel in which brightness of light emerging from the backlight unit into the liquid crystal display panel becomes 50% of that in the normal direction; and the isochromatic viewing angle is defined as a range of viewing angles from the normal direction, where an absolute shift in an x coordinate of the primary red viewed at off-normal angles is not greater than 0.0314, an absolute shift in a y coordinate of the primary green viewed at off-normal angles is not greater than 0.0273, and an absolute shift in an x coordinate of the primary blue viewed at off-normal angles is not greater than 0.0177, with respect to corresponding coordinates of corresponding primary colors of the primary red, the primary green and the primary blue viewed in the normal direction, on the CIE 1931 chromaticity diagram.

In the color liquid crystal display device of the above configuration, the range in angle of emergence of illuminating light from the backlight unit is limited to within the range in off-normal viewing angles over which variations in display color are tolerable in the liquid crystal display panel.

The range in off-normal viewing angles over which variations in display color are tolerable in the liquid crystal display panel is determined by the liquid crystal panel itself, this range shall be defined as an isochromatic viewing angle. The half-brightness angle of illuminating light from the backlight unit is set to be smaller than the isochromatic viewing angle for at least one azimuthal viewing angle on the display panel.

With this configuration, the unnecessary emergence of light from the backlight unit is saved, so that it is possible to reduce the power consumption.

The display color is uniform in the angle range of light emerging from the backlight unit, and thereby a high picture quality can be simultaneously realized.

BRIEF DESCRIPTION OF THE DRAWINGS

In the drawings, which form an integral part of the specification and are to be read in conjunction therewith, and in which like reference numerals designate similar components throughout the figures, and in which:

FIG. 3 shows chromaticity coordinates of white and three primaries (red, green, blue) displayed in the color liquid crystal display device of the present invention;

DETAILED DESCRIPTION OF THE PREFERRED EMBODIMENTS

Hereinafter, preferred embodiments of the present invention will be described with reference to the accompanying drawings.

Embodiment 1

Figure 1:
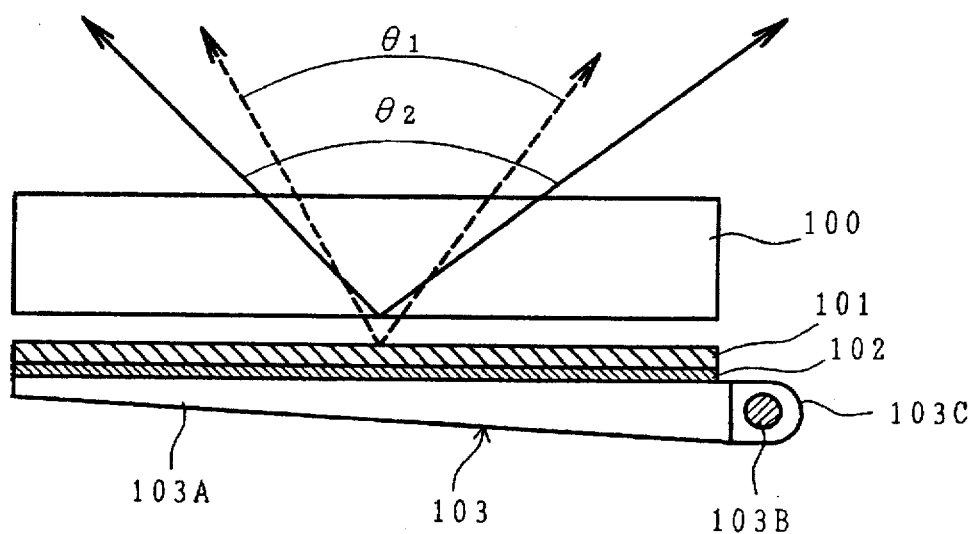
FIG. 1 is a side view of one embodiment of a color liquid crystal display device of the present invention.

FIG. 1 is a side view of an embodiment of a liquid crystal display device according to the present invention.

A liquid crystal display panel 100 includes an envelope composed of a pair of opposing transparent substrates sandwiching a liquid crystal layer therebetween. The display area is formed on the surfaces of the substrates in contact with the liquid crystal layer. The display area is composed of a large number of pixels arranged in a matrix, and each pixel can control the degree of light transmission through the liquid crystal layer independently of each other. Each pixel is provided with a color filter corresponding to one of three color primaries. The liquid crystal display panel 100 is of a so-called in-plane switching type which is known to give a sharp image to an operator viewing the panel 100 even at a large angle from the normal to the display surface, and is known to be excellent in wide viewing angle characteristics. The detailed configuration of the liquid crystal display panel 100 will be described later.

A backlight unit 103 is disposed behind the liquid crystal display panel 100. The backlight unit 103 in this embodiment includes a cold cathode ray tube 103B, a reflector 103C, and a light guide 103A having a light diffuser 102 and a corrugated sheet 101 stacked thereon in this order.

In the backlight unit 103, the light emitted from the cold cathode ray tube 103B is directed into the light guide 103A, emerges from the surface of the backlight unit 103 facing the liquid crystal display panel 100 through the light diffuser 102 and the corrugated sheet 101, and passes through the liquid crystal display panel 100.

In a liquid crystal display panel, the same color displayed at the same location on the panel appears to be colors different depending upon viewing angles. On the other hand, when two display colors which are intended to be the same color on the display panel have a color difference therebetween, the color difference is allowable in actual practice if it is within some limits.

Accordingly, a range of viewing angles over which the substantially same display color can be achieved is determined for a color on the basis of an allowable color differences determined for the color. In the specification, this range of viewing angles is called an isochromatic viewing angle, and is expressed by reference character $\theta_2$.

In this specification, the display colors are considered to be determined by the spectral characteristics of the cold cathode ray tube and other optical components in the backlight unit as well as those of primary color filters provided in the liquid crystal display panel.

A half-brightness angle $\theta_1$ can be defined in the backlight unit 103. In this embodiment, especially, the half-brightness angle $\theta_1$ of the backlight unit 103 is set to be smaller than the isochromatic viewing angle $\theta_2$ of the liquid crystal display panel 100.

Here, the half-brightness angle $\theta_1$ of the backlight unit 103 is defined as an angle measured at the 50% of the peak or head-on brightness of the light emerging from the backlight unit 103.

It is well-known that the display color shift in each of three display primaries (red, green, blue) displayed in the maximum brightness state is most conspicuous. Accordingly, the color uniformity can be judged based on the degree of color shift depending on changes in viewing angle for each of three primaries (red, green, blue) displayed in the maximum brightness state.

Figure 2:
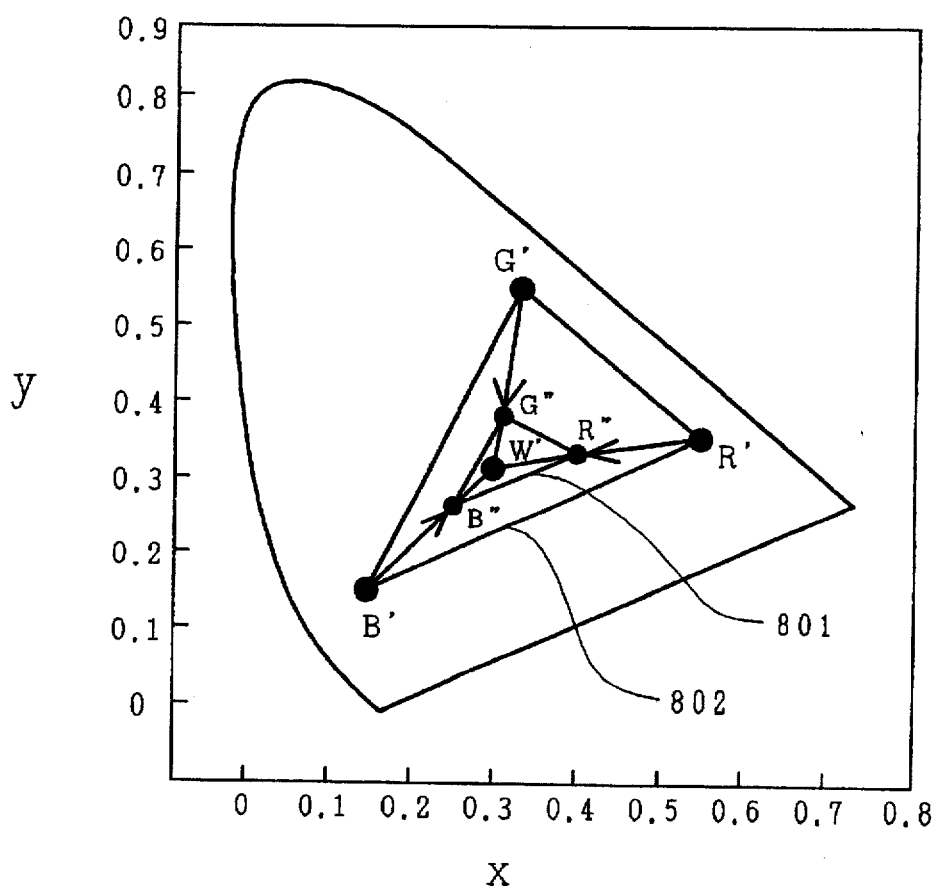
FIG. 2 is a CIE 1931 chromaticity diagram showing color shifts of three primaries in the color liquid crystal display device.

FIG. 2 is a so-called CIE 1931 chromaticity diagram, R', G', B' and W' indicate chromaticities of colors of red, green, blue and white displayed in their maximum brightness (i.e., three display primaries and white) and viewed in a direction normal to the liquid crystal display panel 100, respectively. A triangle with vertices at the points R', G' and B' is a gamut of reproducible colors viewed in the normal direction of the liquid crystal display panel.

In the color liquid crystal display device, the chromaticity coordinates of three display primaries, R', G' and B' vary with viewing angle. When the points R', G' and B' shift toward the point W', the gamut of reproducible colors is narrowed. For example, as shown in FIG. 2, when the points R', G' and B' shift to the points R", G" and B" at a viewing angle, the gamut of colors reproducible by the liquid crystal display device at the viewing angle is within a triangle with apexes at the points R", G" and B". At this time, the colors corresponding to the points R', G' and B' cannot be reproduced and also the gamut of reproducible colors is significantly narrowed.

This shows the degree of shifts in R', G'and B' toward W' with viewing angle can be a measure for determining an area of uniform color in the color liquid crystal display device.

FIG. 3 shows an example of x, y coordinates of R', G' and B' (three primaries) and W' (white) shown in FIG. 2. In this table, $\Delta x$ indicates the absolute difference between the x coordinate of each of R', G' and B' and the x coordinate of W', while $\Delta y$ indicates the absolute difference between the y coordinate of each of R', G' and B' and the y coordinate of W'. As a result, the distance between each of the point R', G' and B' and the point W' on the chromaticity diagram is given by $$\sqrt{\Delta x^2 + \Delta y^2}$$

As can be seen from FIG. 2, the gamut of reproducible colors is significantly narrowed when the points R', G' and B' shift toward the point R', and accordingly the degree of color shift in each of three primaries (red, green, blue) can be evaluated by the shift ($\sqrt{\Delta x^2 + \Delta^2}$) in each of R', G' and B' toward W'.

A method of evaluating the color shift with viewing angle in a liquid crystal display panel is not generally standardized. The reason for this is due to a difficulty in its quantitative definition. However, a method of measuring variations in brightness with viewing angle for various gray levels is specified in EIAJED-2522 (measurement method for a matrix type liquid crystal display module), in which a range of viewing angles over which gray scale inversion does not occur is defined as a non-gray-level-inversion viewing angle in reproducing an eight-level gray scale chart irrespective of the number of gray-scale levels reproducible by a liquid crystal module to be evaluated.

In this embodiment, the color shift is evaluated as follows:

The display of colors in the liquid crystal display panel is based on three primaries, red, green and blue, and the shifts in these three primaries are adopted for evaluation of color shifts. In a liquid crystal display panel, since all of display colors are produced by a combination of three primaries, the color shift in all of colors can be substantially evaluated by the color shift in the three primaries.

In evaluating color shift in one of three primaries, the color is displayed at the maximum brightness level and each of the remaining two colors is displayed at the minimum brightness level. In other word, each of red, green or blue is displayed at the maximum brightness level for evaluation of its color shift. The determination of color shift in such a condition is practically effective in that the color shift in this condition is most visually conspicuous, and that the color shift in this condition leads to a reduction in a range of reproducible colors.

The distances between the chromaticity coordinates R' (xr, yr), G' (xg, yg) and B' (xb, yb) of three display primaries (red, green, blue) in the above condition, and the chromaticity coordinates R' (xw, yw) of combined three primaries (red, green, blue) displayed at the minimum brightness level (that is, white), viewed in the normal direction of the liquid crystal display panel are respectively given by the following formulas (1), (2) and (3):

$$\sqrt{(xr-xw)^2 + (yr-yw)^2} \quad (1)$$

$$\sqrt{(xg-xw)^2 + (yg-yw)^2} \quad (2)$$

$$\sqrt{(xb-xw)^2 + (yb-yw)^2} \quad (3)$$

The above distance is divided into eight length for each color after the example of the above-described method of measuring a non-gray-level-inversion viewing angle.

In this embodiment, the distance is simply divided into eight equal lengths, and one eighth of the distance is taken as an allowable color shift $\Delta C$. The color non-uniformity is judged allowable when the color shift in each of the chromaticity coordinates R', G' and B' of three primaries with viewing angle is less than the allowable value $\Delta C$. This criterion is taken as Criterion 1.

The viewing angle characteristics for display colors in the liquid crystal display panel in this embodiment are experimentally examined on the basis of Criterion 1. The results are shown in FIGS. 3, 4, 5 and 6.

FIG. 3 shows x, y coordinates of W', R', G' and W; and the allowable color shift $\Delta C$ in each of red, green and blue as Criterion 1.

The Criterion 1 can be modified as follows. As shown in FIG. 2, a gamut of the reproducible colors is significantly reduced by the shift in the x-coordinate of R' and the shift in the y-coordinate of G'. The shifts in both x and y coordinates of B' equally reduce a gamut of the reproducible colors. As a result, the shift in the x coordinate of red; the shift in the y coordinate of green; and the shift in the x coordinate of blue (for strict evaluation) may be used instead of $\sqrt{(x-xw)^2+(y-yw)^2}$ for simplified calculation. This criterion is indicated as Criterion 2 in FIG. 3.

The isochromatic viewing angle $\theta_2$ is defined as the range of viewing angles from the normal of the liquid display panel 100, where the absolute shift in an x coordinate of the display primary red viewed at off-normal angles is not greater than 0.0314, the absolute shift in a y coordinate of the display primary green viewed at off-normal angles is not greater than 0.0273, and the absolute shift in an x coordinate of the display primary blue viewed at off-normal angles is not greater than 0.0177, with respect to corresponding coordinates of corresponding primary colors viewed at a normal angle to the liquid crystal panel, on the CIE 1931 chromaticity diagram, when all the primary colors are displayed at their maximum brightness.

Figure 4:
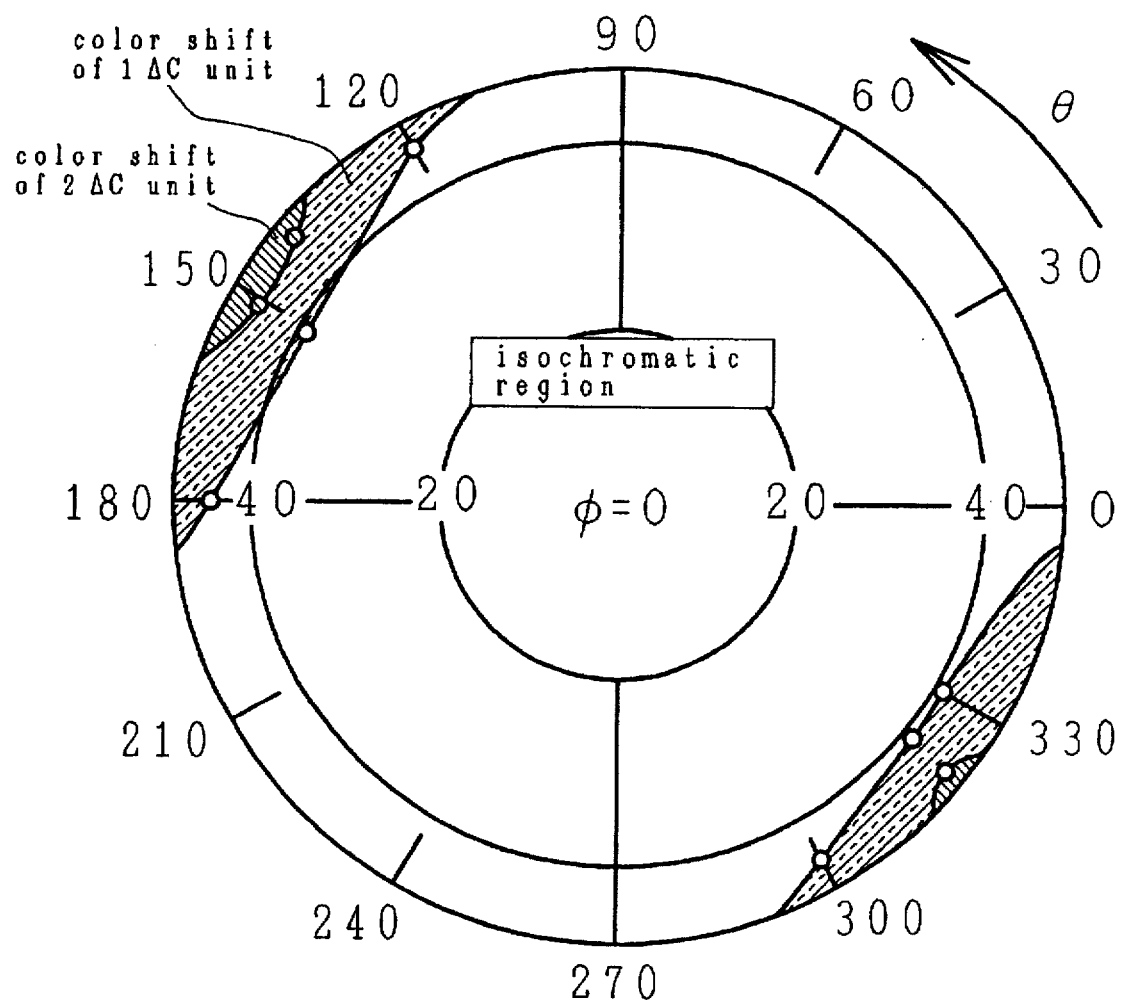
FIG. 4 is a diagram showing a red color-uniform region in a liquid crystal display panel of the color liquid crystal display device of the present invention.
Figure 5:
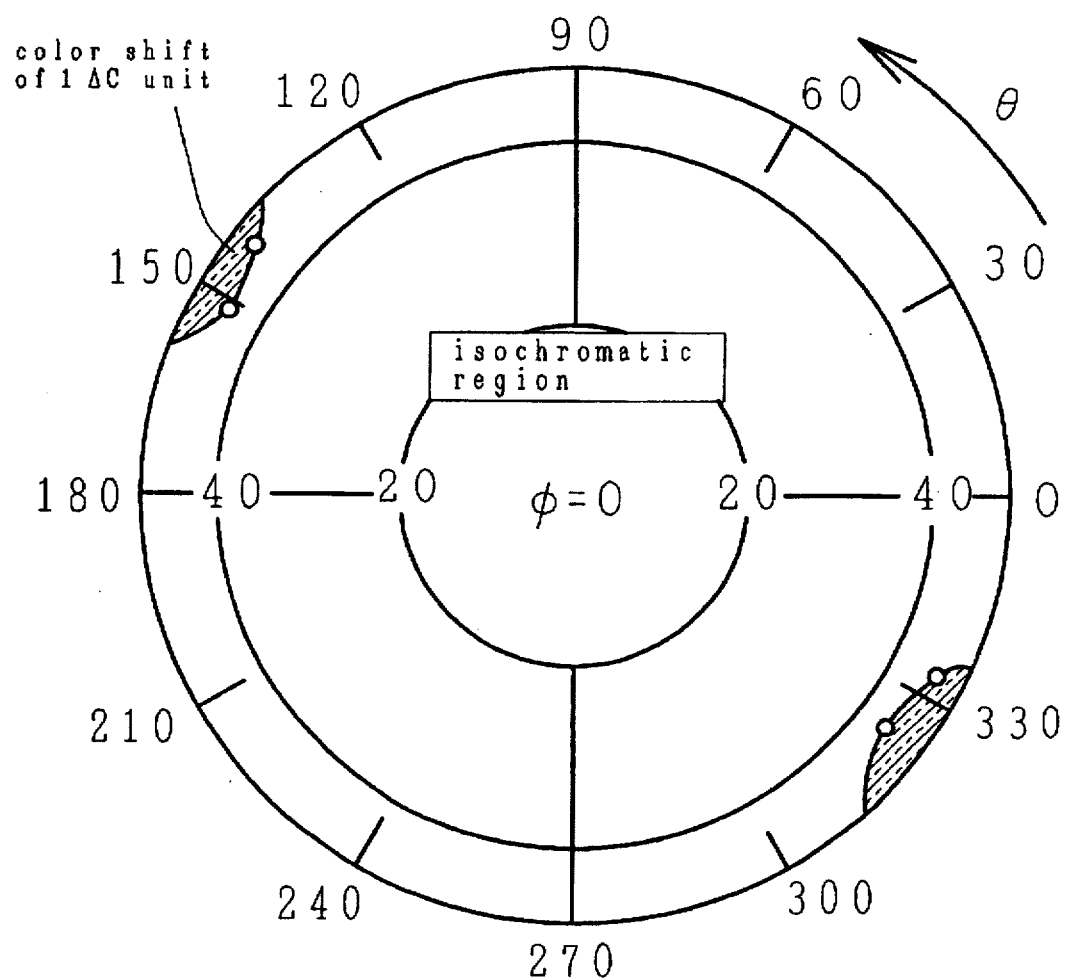
FIG. 5 is a diagram showing a green color-uniform region in a liquid crystal display panel of the color liquid crystal display device of the present invention.
Figure 6:
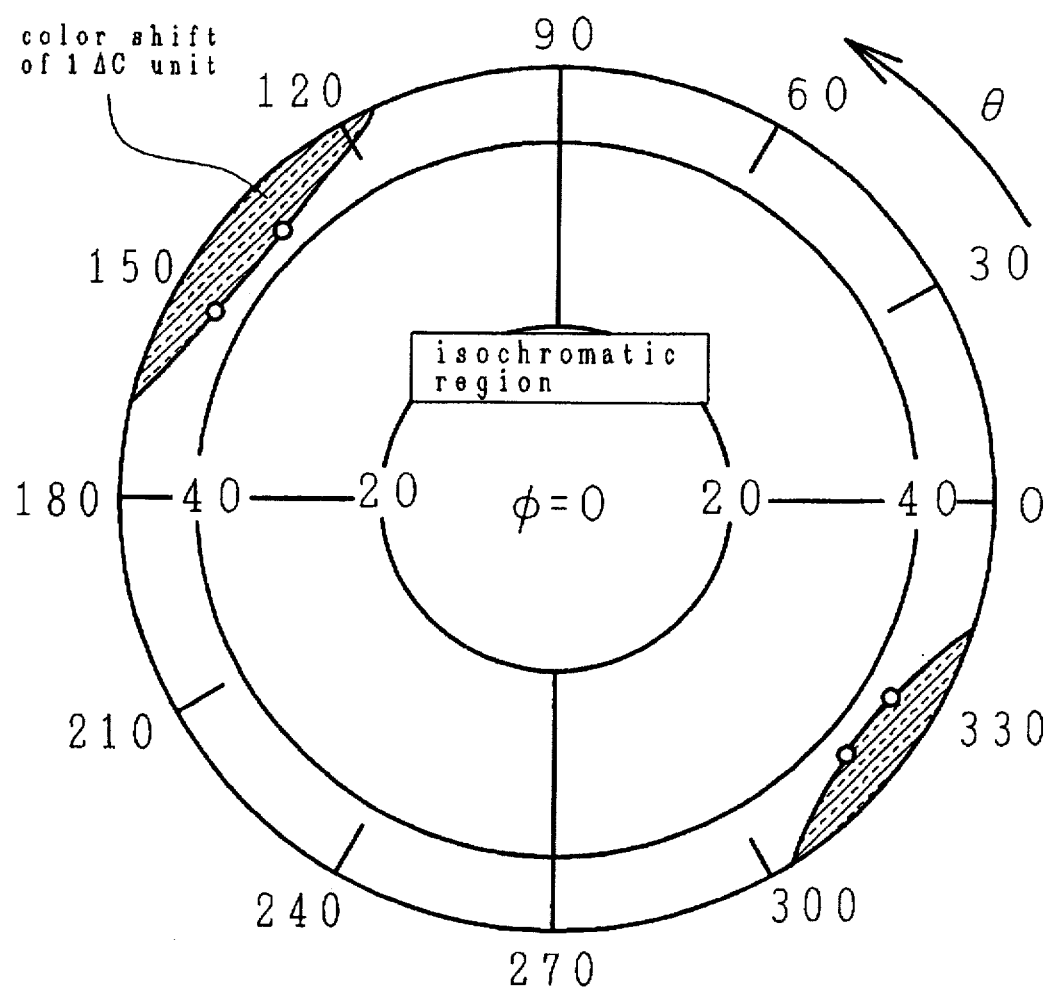
FIG. 6 is a diagram showing a blue color-uniform region in a liquid crystal display panel of the color liquid crystal display device of the present invention.
Figure 7:
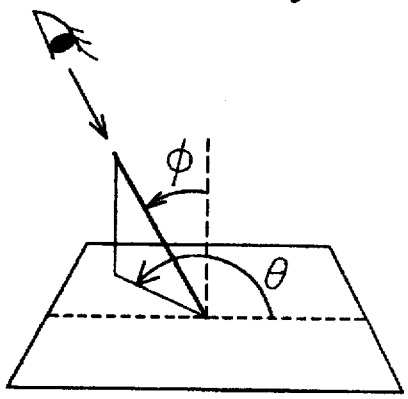
FIG. 7 is a view illustrating the definitions of the viewing angle shown in FIGS. 4 to 6.

The color-uniform ranges for red, green and blue on the basis of the allowable color shift $\Delta C$ by Criterion 2 are shown in FIGS. 4 to 6, respectively.

FIG. 4 is a diagram showing a viewing angle characteristic for red display; FIG. 5 is a diagram showing a viewing angle characteristic for green display; and FIG. 6 is a diagram showing a viewing angle characteristic for blue display. In these figures, reference characters $\theta$, $\phi$ indicate an azimuthal angle and a polar angle with respect to a direction normal to the liquid crystal display panel, respectively.

It is apparent from these figures that unallowable color shift does not occur in the range of 40° or less of polar angles for substantially all azimuthal angles in display of each of red, green and blue.

This shows that the isochromatic viewing angle $\theta_2$ of the liquid crystal display panel in this embodiment is 80° (40°×2) for all azimuthal angles; and 100° or more (50°×2 or more) in the vertical direction.

Next, one embodiment of the so-called in-plane switching type liquid crystal display panel 100 will be described.

First, a so-called in-line switching type liquid crystal display substrate to which the present invention is applied will be briefly described.

Figure 13:
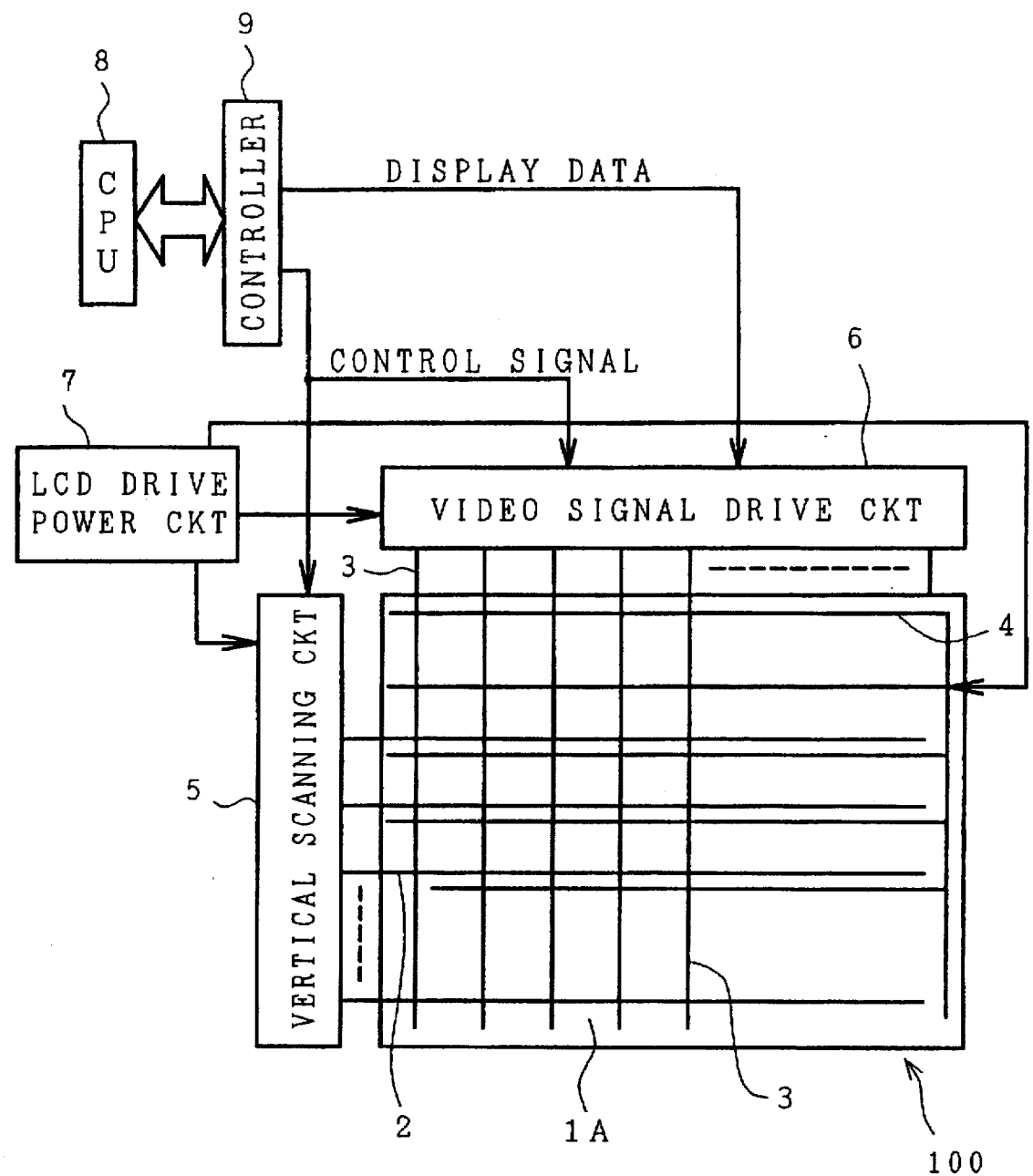
FIG. 13 is a diagram showing the configuration of the liquid crystal display panel and its driving circuit used for the color liquid crystal display device of the present invention.

As shown in FIG. 13, a liquid crystal display panel 100 includes a pair of transparent substrates which sandwich a liquid crystal layer therebetween. Scanning signal lines 2 and reference signal lines 4, each of which extends in the x direction (row direction), are juxtaposed in the y direction (column direction) on the surface of one transparent substrate 1A facing the liquid crystal layer.

More specifically, a first reference signal line 4, a first scanning signal line 2 relatively largely spaced from the first reference signal line 4, a second reference signal line 4 closely spaced from the first scanning signal line 2, a second scanning signal line 2 relatively largely spaced from the second reference signal line 4 . . . , are arranged from the top of the transparent substrate 1A in this order.

Video signal lines 3, each extending in the y-direction, are juxtaposed in the x direction in such a manner as to be insulated from the scanning signal lines 2 and the reference signal lines 4.

A pixel is formed in a relatively wide rectangular region surrounded by the scanning signal line 2, reference signal line 4 and video signal line 3. These pixels are arranged in a matrix, and form a display area. The detailed configuration of the pixel will be described later.

The liquid crystal display panel 100 includes external circuits composed of a vertical scanning circuit 5 and a video signal drive circuit 6. The vertical scanning circuit 5 sequentially supplies a scanning signal (voltage) to each scanning signal line 2 and the video signal drive circuit 6 supplies a video signal (voltage) to each video signal line 3 in synchronization with the timing of the scanning signal.

A liquid crystal drive power circuit 7 supplies a power to each of the vertical scanning circuit 5 and the video signal drive circuit 6. A controller 9 divides video information supplied from a CPU into display data and a control signal. The display data and the control signal are inputted into the video signal drive circuit 6, and the control signal is inputted into the vertical scanning circuit 5. The reference signal line 4 is supplied with a voltage from the liquid crystal drive power circuit 7.

Hereinafter, one embodiment of the pixel in the liquid crystal display panel 100 having the above configuration will be described.

Figure 8:
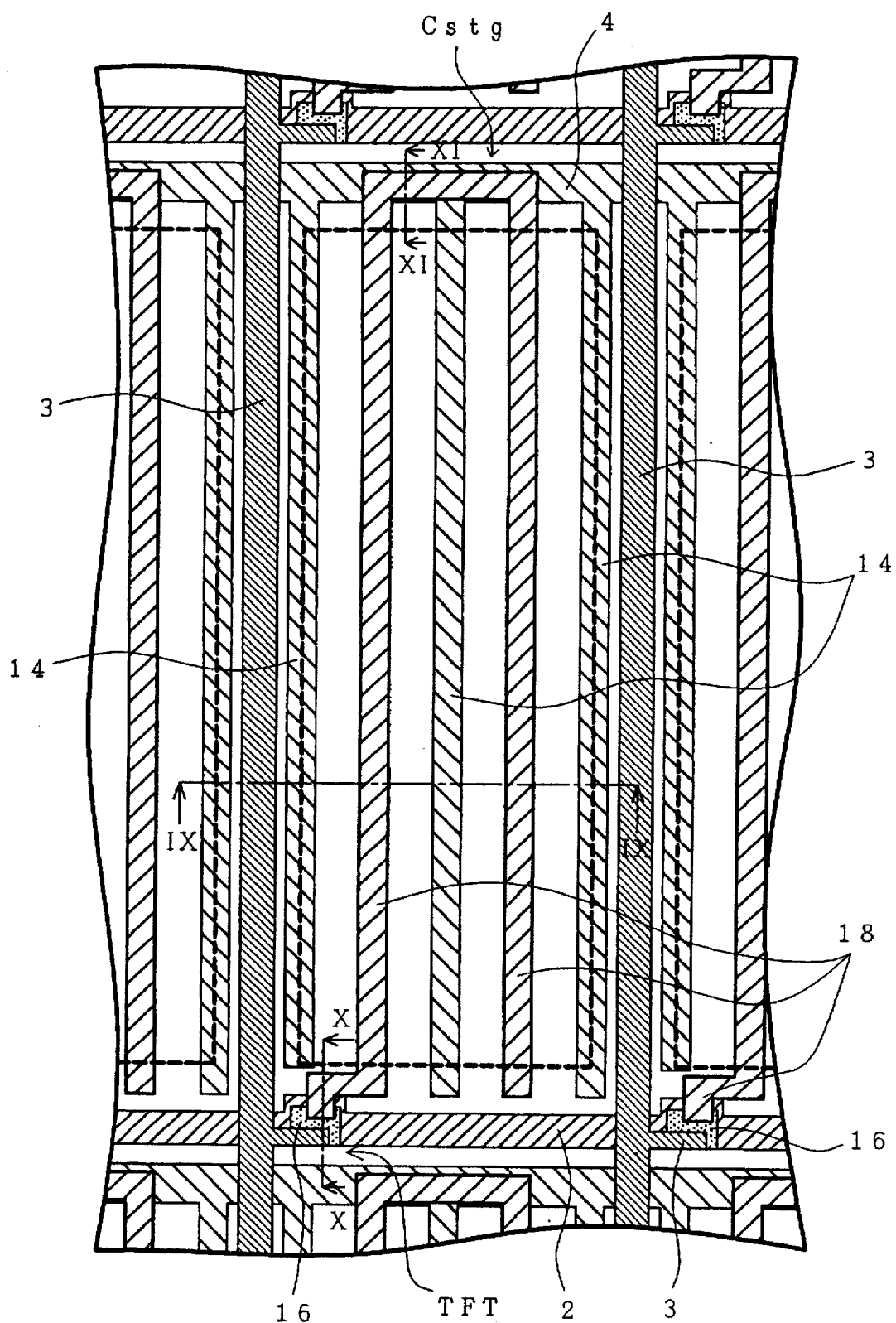
FIG. 8 is a plan view showing the configuration of one embodiment of a liquid crystal display panel used for the color liquid crystal display device of the present invention.
Figure 9:
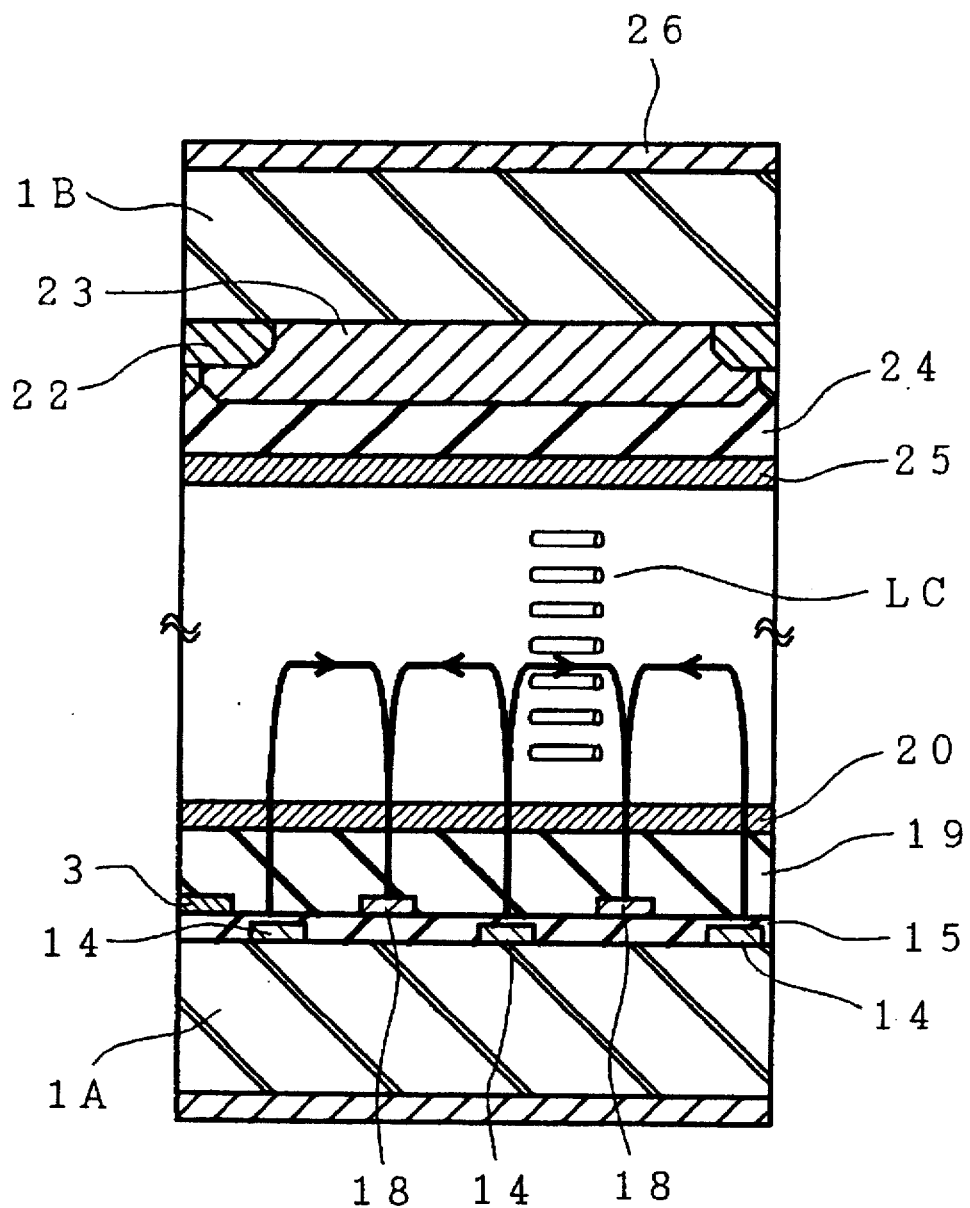
FIG. 9 is a sectional view taken on line IX—IX of FIG. 8.
Figure 10:
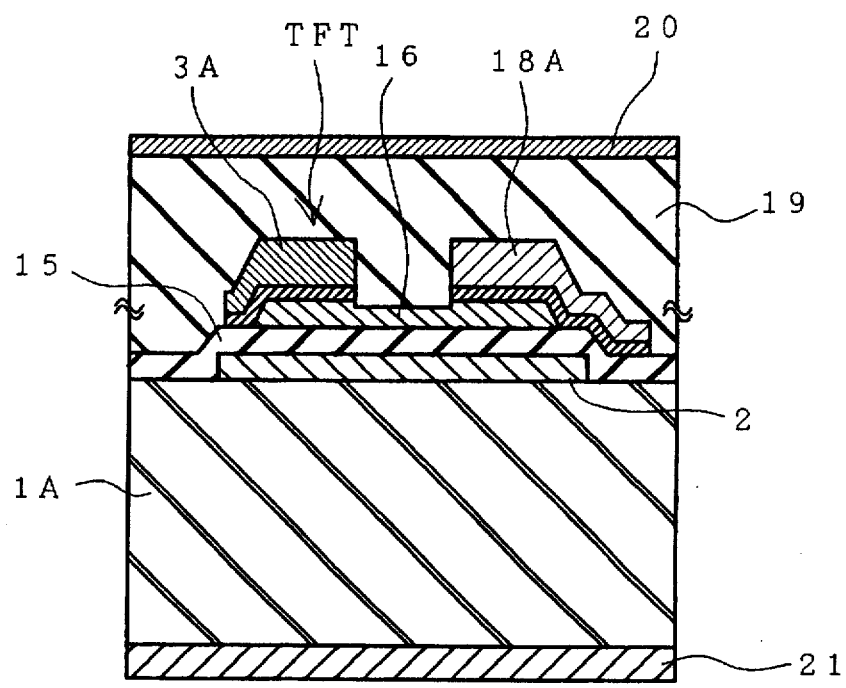
FIG. 10 is a sectional view taken on line X—X of FIG. 8.

FIG. 8 is a plan view showing the embodiment of the pixel in the liquid crystal display panel 100, in which a coordinate system is used in which the x direction is horizontal, the y direction is vertical in a plane of the major surface of the substrate and the z direction is taken as the substrate normal. The same is true for the following description. FIG. 9 is a sectional view taken on line IX—IX of FIG. 8; FIG. 10 is a sectional view taken on line X—X of FIG. 8; and FIG. 11 is a sectional view taken on line XI—XI of FIG. 8.

In FIG. 8, each reference signal line 4 extending in the x direction and each scanning signal line 2 spaced from and parallel to the reference signal line 4 are formed on the major surface of the transparent substrate 1A (see FIG. 13).

Three reference electrodes 14 are integrally formed with the reference signal line 4. Of these reference electrodes 14, two extend to the vicinity of the scanning signal line 2 in the negative y direction in such a manner as to be in proximity with the long sides of a pixel region defined by the reference signal line 4, the scanning signal line 2 and a pair of the video signal lines 3 (described later), that is, in proximity with the video signal lines 3; and the remaining one is disposed between the two reference electrodes 14.

Figure 11:
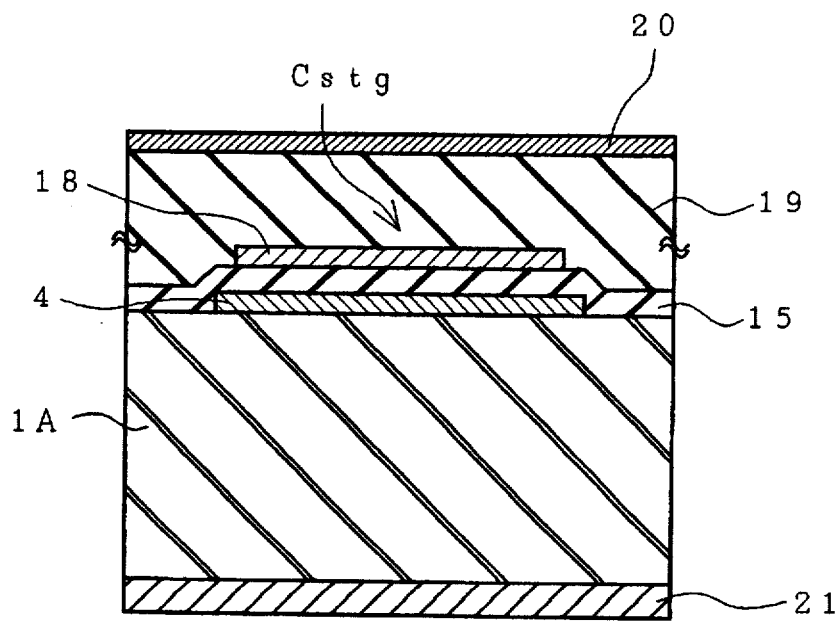
FIG. 11 is a sectional view taken on line XI—XI of FIG. 8.

The surface of the transparent substrate 1A is covered with an insulating film 15 made of silicon nitride, for example, in such a manner as to cover these scanning signal lines 2, reference signal lines 4 and reference electrodes 14 formed thereon (see FIGS. 9, 10, 11). The insulating film 15 functions for each video signal line 3 as an interlayer insulating film at intersections of the video signal line 3 with the scanning signal line 2 and the reference signal line 4; as a gate insulator for each region on which a thin film transistor TFT is formed; and as a dielectric for each region on which a storage capacitor Cstg is formed.

A semiconductor layer 16 is first formed on the surface of the insulating film 15 at each region on which the thin film transistor TFT is to be formed. The semiconductor layer 16 is made of, for example, amorphous silicon, which is formed over the scanning signal line 2 with the insulating film 15 interposed in such a manner as to be superposed on a portion thereof in the vicinity of the video signal line 3. Accordingly, part of the scanning signal line 2 serves as the gate electrode of the thin film transistor TFT.

The video signal lines 3, each extending in the y direction, are juxtaposed in the x direction on the surface of the insulating film 15 thus formed.

A drain electrode 3A, extending up to part of the surface of the semiconductor layer 16 of the thin film transistor TFT, is formed integrally with the video signal line 3.

A display electrode 18 is formed on the surface of the insulating film 15 at the pixel region in such a manner as to extend between the reference electrodes 14. More specifically, the display electrode 18 has a folded-line structure shown in FIG. 8 in which one end thereof serves as a source electrode 18A of the thin film transistor TFT, and extends in the positive y direction, bends in the x direction along the reference signal line 4, extends in the negative y direction and terminates as the other end.

A portion of the display electrode 18 which is superposed over the reference signal line 4 forms the storage capacitor Cstg composed of the insulating film 15 as the dielectric between the portions of the display electrode 18 and the reference signal line 4. The storage capacitor Cstg stores video information further at the display electrode 18 when the thin film transistor TFT is turned off.

The surface of the semiconductor layer 16 at portions forming interfaces with the drain electrode 3A and the source electrode 18A of the thin film transistor TFT is formed with a layer heavily-doped with phosphorus (P), to thus form an ohmic contact with each electrode. In this process, the heavily-doped layer is formed over the entire surface of the semiconductor layer 16, followed by formation of the electrodes, and the heavily-doped layer at portions other than the above electrode formation regions is etched away using the electrodes as a mask.

A protective film 19 made of, for example, silicon oxide, is formed on the upper surface of the insulating film 15 on which the thin film transistors TFT, video signal lines 3, display electrodes 18 and storage capacitors Cstg are formed (see FIGS. 9, 10, 11), and an orientation film 20 is formed on the upper surface of the protective film 1 9, to thus constitute a lower substrate of the liquid crystal display panel 100. A polarizer 21 is disposed on the surface opposite to the liquid crystal layer, of the lower substrate.

As shown in FIG. 9, a light blocking film 22 is formed on a transparent substrate 1B (upper substrate) on the liquid crystal layer side at portions corresponding to the boundaries between the pixel regions. The light blocking film 22 functions to prevent direct irradiation of light to the thin film transistors TFT, and to improve display contrast. The light blocking film 22 is formed at each region shown by broken lines in FIG. 8, and an aperture formed therein constitutes a substantial pixel region.

Color filter 23 for display of three primaries are formed to cover respective apertures in the light blocking film 22, which have color characteristics different from each other between the adjacent pixel regions and have boundaries positioned on the light blocking film 22. A planarizing film 24 made of resin or the like is formed on the surface on which the color filters 23 are formed, and an orientation film 25 is formed on the surface of the planarizing film 24. A polarizer 26 is disposed on the surface, opposite to the liquid crystal layer, of the upper substrate.

Figure 12:
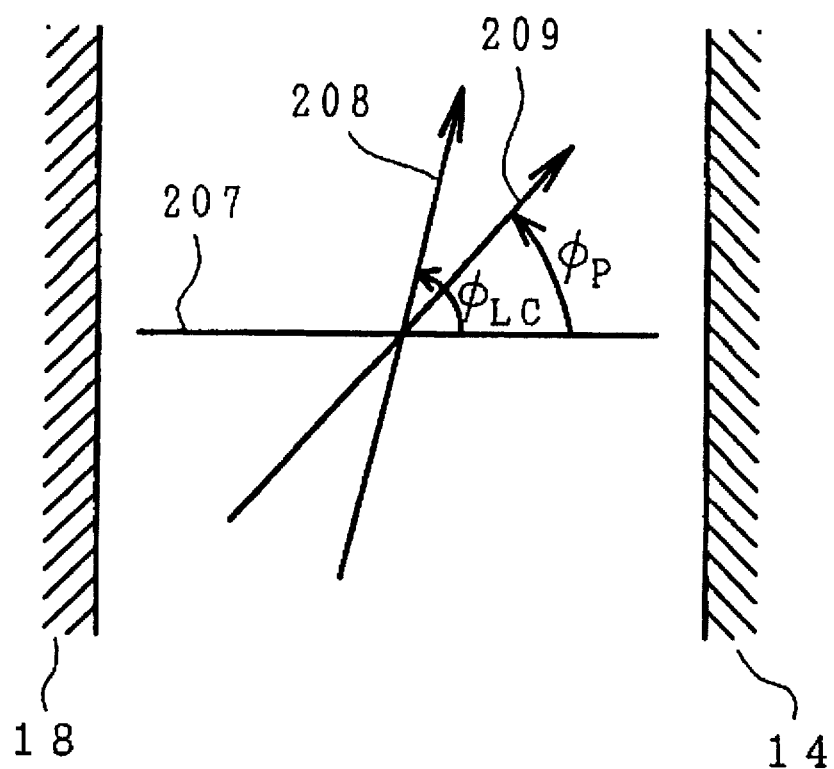
FIG. 12 is a plan view showing one relationship between a liquid crystal alignment and a polarizing axis in a liquid crystal display panel used for the color liquid crystal display device of the present invention.

The relationship between the orientation film 20, the polarizer 21 (each being disposed on the transparent substrate 1A), the orientation film 25, and the polarizer 26 (each being disposed on the transparent substrate 1B) will be described with reference to FIG. 12.

The rubbing direction of each of the orientation films 20, 25 is inclined at an angle $\phi LC$ and the polarizing axis 209 of the polarizer 21 is inclined at an angle $\phi P$, with respect to the direction 207 of an electric field applied between the display electrode 18 and the reference electrode 14. On the other hand, the polarizing axis of the other polarizer 26 is perpendicular to the polarizing axis of the polarizer 21. In this embodiment, the angle $\phi LC$ is equal to the angle $\phi P$. The liquid crystal layer LC is made of a nematic liquid crystal composition having a positive dielectric anisotropy $\Delta \epsilon$ of 7.3 (at 1 kHz) and an optical anisotropy $\Delta n$ of 0.073 (at 589 nm, 20° C.).

The configuration of the orientation films 20, 25 and the polarizers 21, 25 having the above relationship is called a normally black mode which transmits light through the liquid crystal layer LC by application of an electric field E parallel to the transparent substrate 1A in the liquid crystal layer LC. In this embodiment, however, the liquid crystal display panel is not limited to be of the normally black mode but may be of a normally white mode which maximizes light transmission through the liquid crystal layer LC when any electric field is not applied.

The liquid crystal display panel of the normally black mode is known to achieve a contrast ratio of about 140.

The structure of the backlight unit in this embodiment will be described in detail with reference to an exploded perspective view shown in FIG. 18. In this embodiment, the corrugate sheet 101 in the backlight unit has a prismatic outer surface on the liquid crystal display panel side, wherein a vertex angle $\theta_4$ of the prism portion is 100°.

In the corrugate sheet 101, linear vertexes of the prism portion extend parallel to right and left sides of the panel.

It is disclosed in Japanese Patent Laid Open No. 67016/1992 that the use of the corrugate sheet having a prismatic outer surface on the liquid crystal panel side as used for the backlight unit in this embodiment is effective to collect light, that is, make narrower the half-brightness angle of the backlight unit. Such a technology has been used for most of backlight units for portable liquid crystal display panels. In this embodiment, such a corrugate sheet can collect light emerging from the backlight unit in the horizontal direction to thereby obtain the half-brightness angle $\theta_1$ of 70° or less. The in-plane switching type liquid crystal display element used as the liquid crystal display panel 100 in this embodiment has an isochromatic viewing angle of 80° or more as described above, so that the half-brightness angle $\theta_1$ of light emerging from the backlight unit can be made smaller than the isochromatic viewing angle $\theta_2$ at least in the horizontal direction of the liquid crystal display panel.

In the color liquid crystal display device described above, when the liquid crystal display panel 100 is viewed at off-normal angles, the emergence angle of light from the backlight unit 103 is limited to within a specified range in which the unallowable color shift on the display area does not occur.

In this case, the range of viewing angles over which the unallowable color shift on the display area does not occur when the liquid crystal display panel 100 is viewed at off-normal angles is determined by the liquid crystal display panel 100 itself, so that the emergence angle of light from the backlight unit 103 is set to be smaller than the above range of viewing angles which is defined as the isochromatic viewing angle.

With this configuration, the unnecessary emergence of light from the backlight unit 103 is saved, and thereby the power consumption thereof can be reduced.

While the linear vertexes of the prism portion of the corrugate sheet 101 in this embodiment are disposed to extend in parallel to the right and left sides of the panel, they may be disposed in other directions to obtain the same effect as that in this embodiment.

Figure 19:
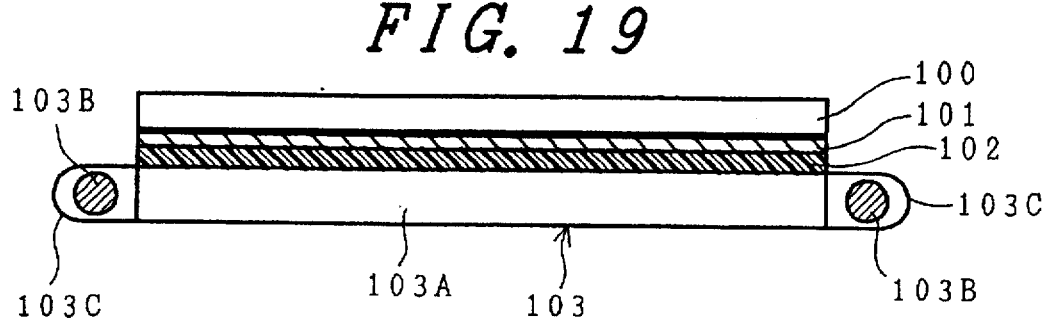
FIG. 19 is a sectional view showing a further embodiment of the color liquid crystal display device of the present invention.
Figure 20:
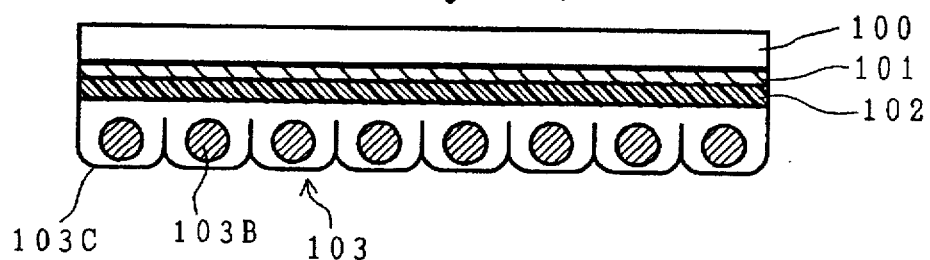
FIG. 20 is a sectional view of a further embodiment of the color liquid crystal display device of the present invention.

In the backlight unit 103 in this embodiment, the light guide 103A has a wedge shape, and the cold cathode ray tube 103B is disposed at the thick end of the wedge shape; however, as shown in FIG. 19, the light guide 103 may be a slab of uniform thickness and the cold cathode ray tube 103B may be disposed at either or each of the ends of the light guide 103A; or as shown in FIG. 20, a plurality of cathode ray tubes 103B may be disposed directly under the light diffuser 102. The cathode ray tube may be of course replaced with a linear or planar light source. While the liquid crystal display panel 100 in this embodiment is of an in-plane switching type known for its wide viewing angle characteristic, it may be of any types of liquid crystal display panels in which the relationship of $\theta_2 > \theta_1$ is satisfied for at least one of three display primaries in at least one viewing direction (for example, the horizontal or vertical direction).

Embodiment 2

Figure 21:
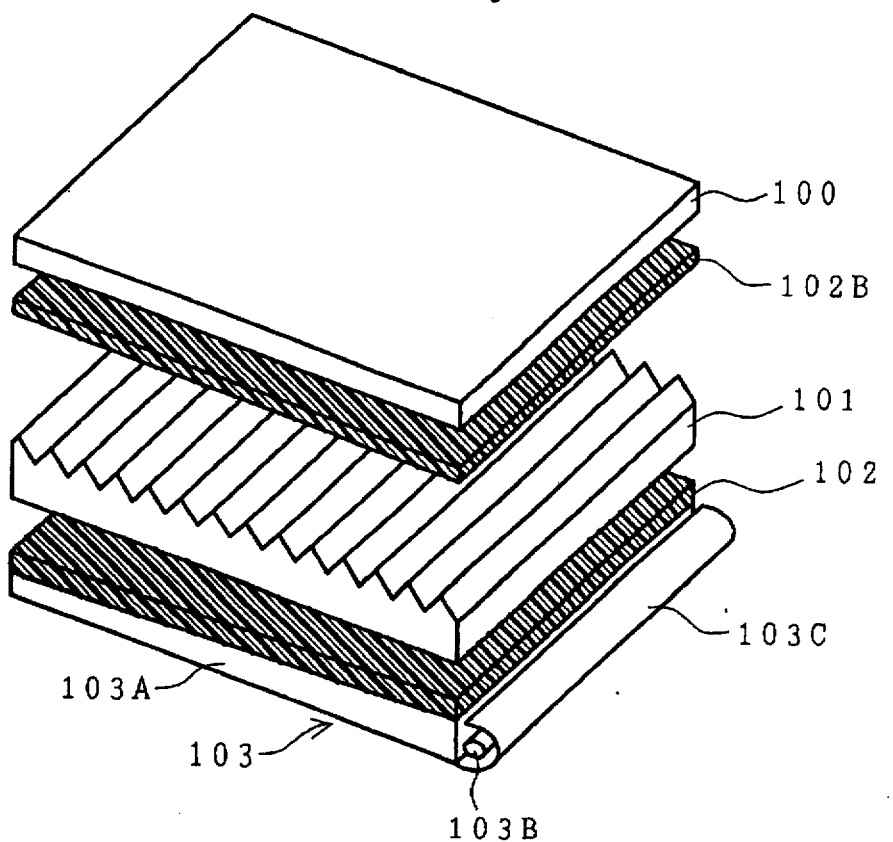
FIG. 21 is an exploded view in perspective of a further embodiment of the color liquid crystal display device of the present invention.

FIG. 21 shows a schematic configuration of this embodiment. This embodiment is different from Embodiment 1 in that a light diffuser 102B having the same property as that of the light diffuser 102 is additionally provided between the liquid crystal display panel 100 and the corrugate sheet 101 in Embodiment 1. The addition of the light diffuser 102B to the corrugate sheet 101 and the light diffuser 102 increases the half-brightness angle from 70° in Embodiment 1 to 80°. In this case, the relationship of $\theta_2 > \theta_1$ is satisfied because the liquid crystal display panel 100 has the isochromatic viewing angle $\theta_2$ of 80° or more for all azimuthal angles, with a result that the same effect as that in Embodiment 1 can be obtained. Also, the additional light diffuser smoothes out the spectral characteristic of light entering the liquid crystal panel, to moderate visual variations in brightness, thereby making it possible to realize the visually natural display in addition to the effect of Embodiment 1.

Embodiment 3

Figure 22:
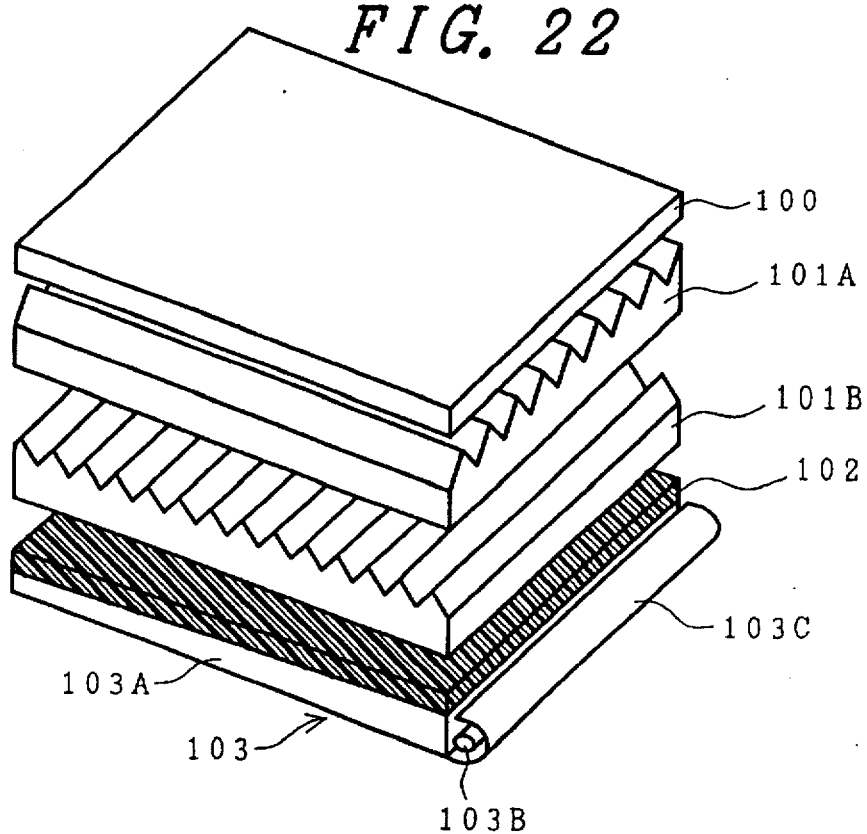
FIG. 22 is an exploded view in perspective of a further embodiment of the color liquid crystal display device of the present invention.

FIG. 22 shows a schematic configuration of this embodiment. This embodiment is different from Embodiment 1 in that two corrugate sheets 101 in Embodiment 1 are provided in this embodiment. Linear vertexes of the prism portions in the corrugate sheets 101 are disposed to extend in the directions perpendicular to each other.

In this embodiment, since the corrugate sheets 101 can collect light not only in the horizontal direction but also in the vertical direction of the liquid crystal display panel, it is possible to reduce the power consumption more than in Embodiment 1.

Embodiment 4

Figure 18:
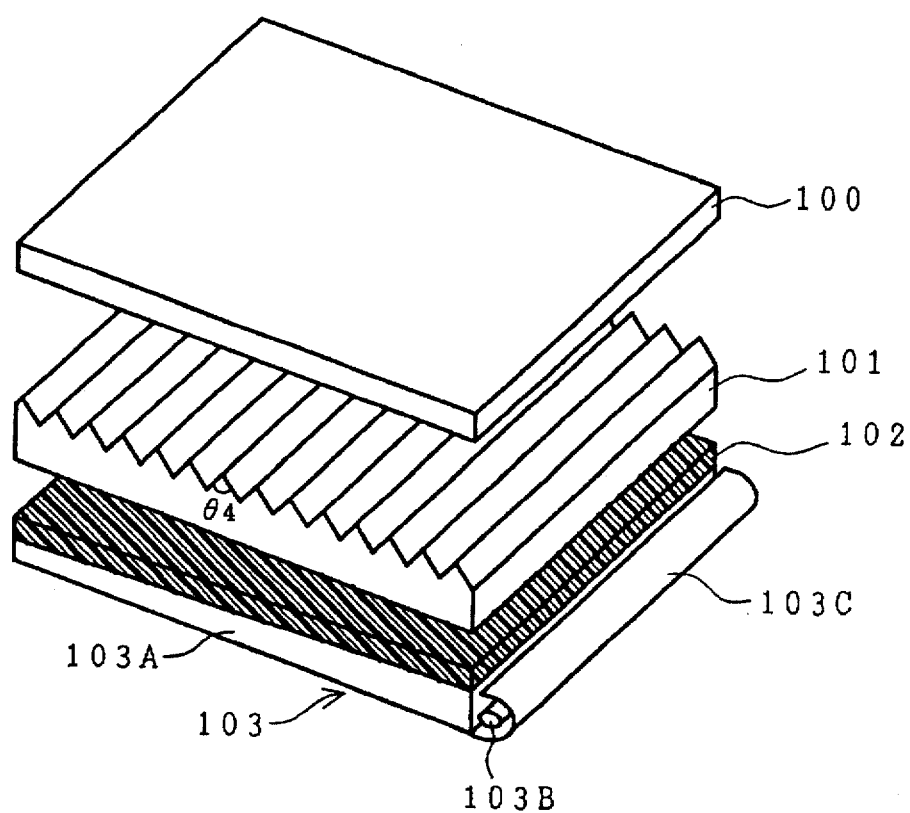
FIG. 18 is an exploded view in perspective of a further embodiment of the color liquid crystal display device of the present invention.

The schematic configuration of this embodiment is the same as that shown in FIG. 18. In this embodiment, the vertex angle $\theta_4$ of the corrugate sheet in Embodiment 1 is 90°. This decreases the half-brightness angle $\theta_1$ to less than 60°, and further increases the head-on brightness.

Embodiment 5

In this embodiment, two corrugate sheets are used as in Embodiment 3. The vertex angle of one sheet for collecting light in the horizontal direction is 100°, and the vertex angle of the other sheet for collecting light in the vertical direction is 90°, so that the collection efficiency for light in the vertical direction is made larger than that in the horizontal direction.

Since the liquid crystal display device is mainly used on a desk, the required range of viewing angles is smaller in the vertical direction than in the horizontal direction. Accordingly, the power consumption can be reduced without degradation of a practical picture quality by making the collection efficiency in the vertical direction larger than that in the horizontal direction. In this embodiment, it is possible to reduce the power consumption more than in Embodiment 3 while maintaining the picture quality in Embodiment 3.

Embodiment 6

Figure 14:
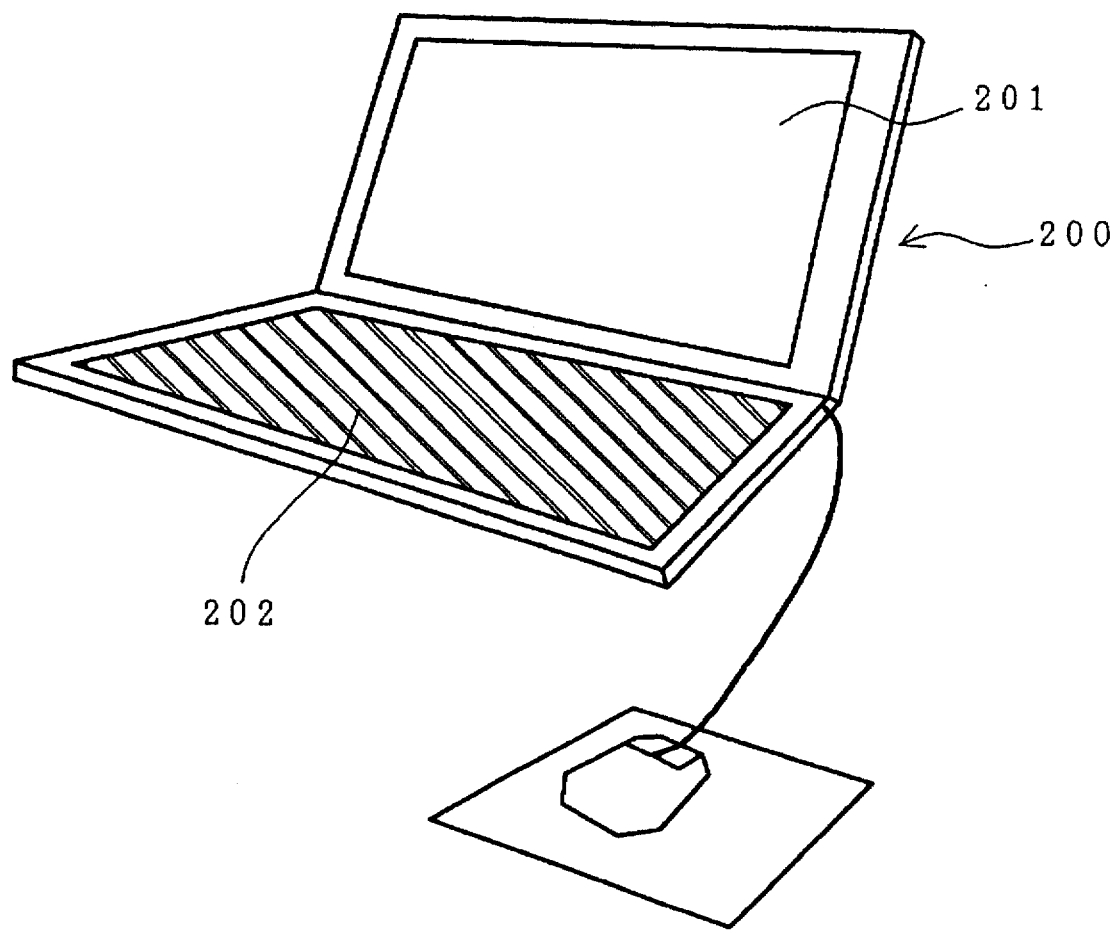
FIG. 14 is an external view showing another embodiment of the color liquid crystal display device of the present invention.

In this embodiment, a liquid crystal display device having a configuration similar to that in Embodiment 1 is used for a notebook personal computer. FIG. 14 is an external view showing the configuration of the liquid crystal display device for a notebook personal computer in this embodiment. The liquid crystal display device 200 for a notebook personal computer includes a liquid crystal display panel 201 integrated with a key board 202. The size of the liquid crystal display panel 201 is thus limited to about 14 inches in diagonal length. On the other hand, a key board operator views the liquid crystal display panel 201 at a distance of about 30 cm or more from the panel.

In this case, the operator can always recognize normal color display over the entire display area when he views the liquid crystal display panel in the normal direction thereof.

Figure 15:
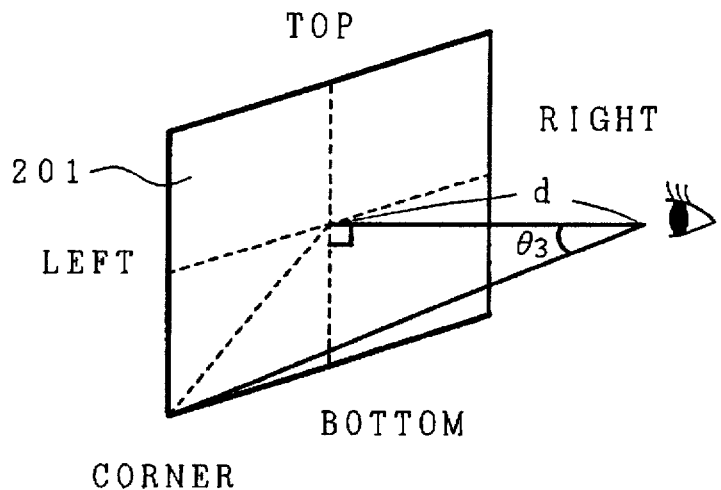
FIG. 15 is a view illustrating the effect of the liquid crystal display device shown in FIG. 14.

As shown in FIG. 15, there are differences in viewing angle between the center and the periphery of the liquid crystal display panel 201. Here, letting "d" be a distance between the eyes of the operator and the center of the panel, the maximum difference in viewing angle becomes $\theta_3$. The maximum difference in viewing angle varies depending on the distance between the eyes of the operator and the center of the panel.

Figure 16:
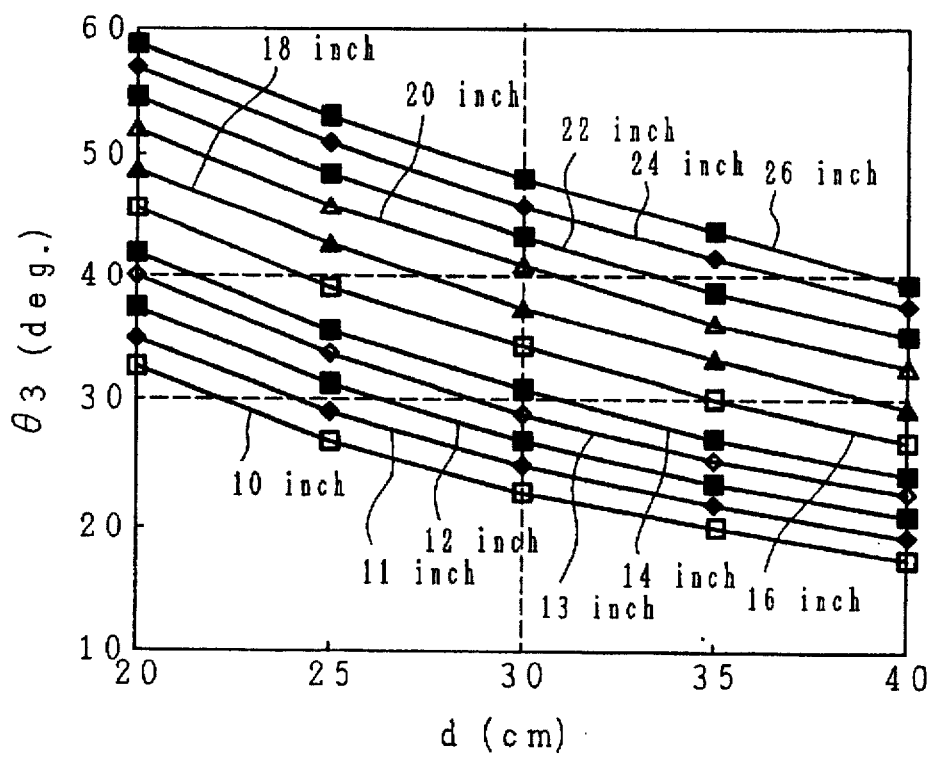
FIG. 16 is a graph showing the effect of the liquid crystal display device shown in FIG. 14.

The relationship between the distance from the eyes of an operator to the panel and differences in viewing angle is calculated for each size of the liquid crystal display panel. The results are shown in FIG. 16.

It is apparent from this graph that the maximum difference in viewing angle is about 30° in the liquid crystal display panel (size: 14 inches; distance "d": 30 cm) used in this embodiment.

Since the isochromatic viewing angle $\theta_2$ of the liquid crystal display panel used in this embodiment is larger than twice the maximum difference (30°×2) in viewing angle, the operator can always recognize the normal display of colors over the entire display area of the panel when he views the liquid crystal display panel in the normal direction thereof.

The liquid crystal display device of the above configuration can provide great advantages in fields associated with colors such as printing and textile industries.

Embodiment 7

Figure 17:
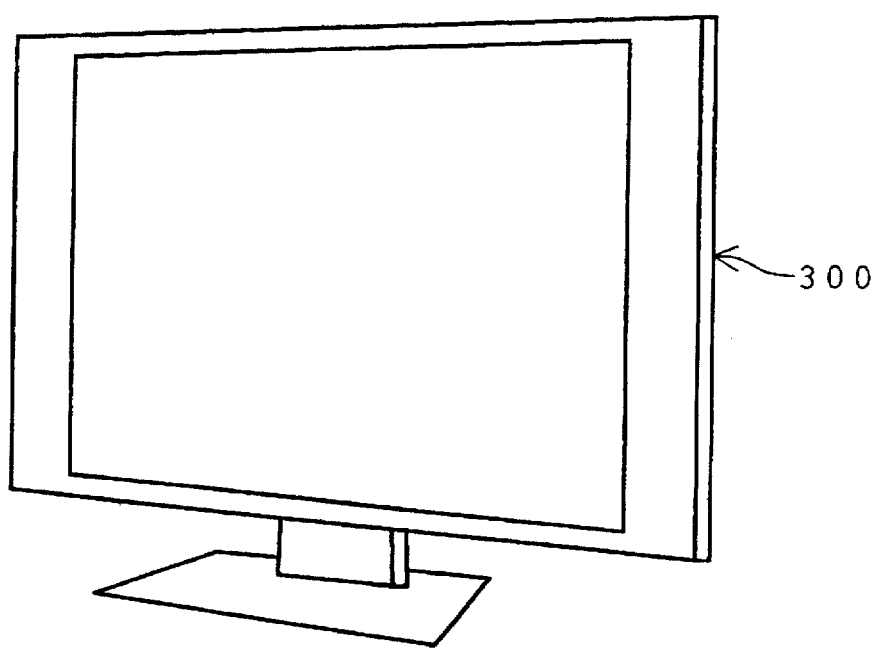
FIG. 17 is an external view showing a further embodiment of the color liquid crystal display device of the present invention.

In this embodiment, a liquid crystal display device of a configuration similar to that in Embodiment 1 is used in a desk-top monitor. FIG. 17 shows the configuration of the liquid crystal display device 300 used in a desk-top monitor in this embodiment. The liquid crystal display device 300 used in the desk-top monitor has a key board attached separately therefrom. Accordingly, the size of the liquid crystal display panel is increased up to 18 inches. A key board operator views the liquid crystal display panel at a distance of about 40 cm or more from the panel.

In the liquid crystal display device 300 of the above configuration, the isochromatic viewing angle $\theta_2$ of the liquid crystal display panel is 80° as already explained. On the other hand, when the size of the liquid crystal display panel is less than 18 inches, it is apparent from FIG. 16 that the maximum viewing angle is 30° at the distance of 40 cm. Accordingly, the isochromatic viewing angle $\theta_2$ of the liquid crystal display panel used in this embodiment is twice the maximum difference (40°×2)in viewing angle, so that the operator can always recognize the normal display of colors over the entire display area of the panel when he views the liquid crystal display panel in the normal direction thereof.

Like Embodiment 6, the liquid crystal display device in this embodiment can provide great advantages in fields associated with colors such as printing and textile industries.

Embodiment 8

In this embodiment, the liquid crystal display device in Embodiment 1 is used in a desk-top monitor. As can be seen from FIG. 16, for the liquid crystal display panel having a diagonal size as large as 26 inches, an operator can always recognize the normal display of colors over the entire display area of the panel when he views the liquid crystal display panel in the normal direction thereof.

Embodiment 9

In this embodiment, a 6-bit driver is incorporated into the video signal drive circuit 6 (see FIG. 13) of the liquid crystal display device in Embodiment 1 for enabling multi-color display for 260,000 colors.

A display of such a large number of colors can be achieved only by the liquid crystal display device capable of increasing a color-uniform display region, which is significantly advantageous for multimedia applications.

Embodiment 10

Figure 23:
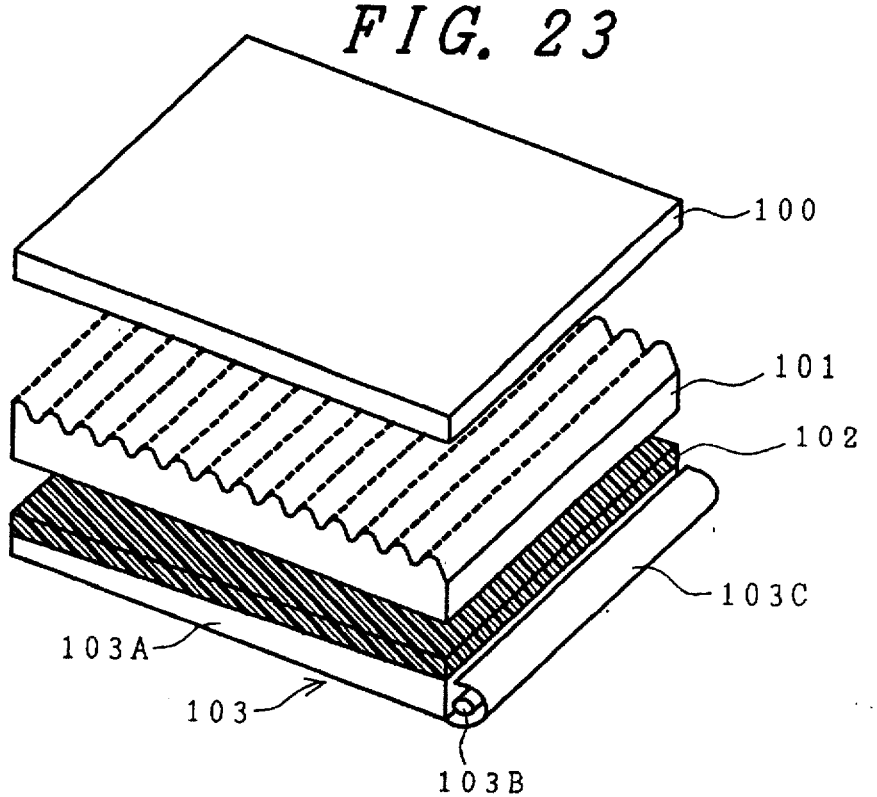
FIG. 23 is an exploded view in perspective of a further embodiment of the color liquid crystal display device of the present invention.

FIG. 23 is a view, similar to FIG. 18 for Embodiment 1, showing the configuration of the liquid crystal display device in this embodiment. In this embodiment, a corrugate sheet 101 having a sine-curve (sinusoidal) outer surface is used in place of the corrugate sheet 101 having the prismatic outer surface in Embodiment 1.

The use of the corrugate sheet having the sine-curve outer surface can exhibit the same effect as that of the corrugate sheet having the prismatic outer surface, as disclosed in U.S. Pat. No. 5,394,255.

By the use of such a corrugate sheet, it is possible to moderate variations in brightness of light emerging from the backlight unit within the angle range of $\theta_1$ more than in Embodiment 1, and hence to improve uniformity of brightness within the display area.

Moreover, in this embodiment, the corrugate sheet having the sine-curve outer surface has the same effect as that of the light diffuser, and accordingly the same effect as that in Embodiment 2 can be obtained without provision of the diffuser 102B on the corrugate sheet 101 (see FIG. 21) and also light absorption in the sheet does not occur because the diffuser 102B is eliminated.

As described above, the liquid crystal display device of the present invention is advantageous in achieving low power consumption.

What is claimed is:

1. A color liquid crystal display device comprising:
   a liquid crystal display panel including color filters corresponding to primary red, primary green and primary blue; and
   a backlight unit disposed behind said liquid crystal display panel;
   wherein said color liquid crystal display device satisfies a relationship of an isochromatic viewing angle>a half-brightness angle, for at least one azimuthal viewing angle,
   where said half-brightness angle is defined as an angle of a direction inclined with respect to a normal direction of said liquid crystal display panel in which brightness of light emerging from said backlight unit into said liquid crystal display panel becomes 50% of that in said normal direction; and
   said isochromatic viewing angle is defined as a range of viewing angles from said normal direction where an absolute shift in an x coordinate of said primary red viewed at off-normal angles is not greater than 0.0314, an absolute shift in a y coordinate of said primary green viewed at off-normal angles is not greater than 0.0273, and an absolute shift in an x coordinate of said primary blue viewed at off-normal angles is not greater than 0.0177, with respect to corresponding coordinates of corresponding primary colors of said primary red, said primary green and said primary blue viewed in said normal direction, on the CIE 1931 chromaticity diagram.

2. A color liquid crystal display device according to claim 1, wherein said isochromatic viewing angle is more than twice a maximum difference in viewing angle, said maximum difference in viewing angle being defined as an angle viewing a corner of said liquid crystal display panel with respect to a normal to a center of said liquid crystal display panel at a predetermined viewing distance.

3. A color liquid crystal display device according to claim 1, wherein a corrugate sheet having a light collection property is interposed between said liquid crystal display panel and said backlight unit.

4. A color liquid crystal display device according to claim 1, wherein a corrugate sheet having a prismatic outer surface on a side thereof of said liquid crystal display panel is interposed between said liquid crystal display panel and said backlight unit, a vertex angle of said prismatic outer surface being 100° or less.

5. A color liquid crystal display device according to claim 1, wherein two corrugate sheets are interposed between said liquid crystal display panel and said backlight unit; one of said two corrugate sheets collecting light in a horizontal direction of said color liquid crystal display device, the other of said two corrugate sheets collecting light in a vertical direction of said color liquid crystal display device and a collection efficiency of said other of said two corrugate sheets being higher than that of said one of said two corrugate sheets.

6. A color liquid crystal display device comprising:
a liquid crystal display panel including color filters corresponding to primary red, primary green and primary blue; and
a backlight unit disposed behind said liquid crystal display panel;
wherein said color liquid crystal display device satisfies a relationship of an isochromatic viewing angle>a half-brightness angle, for at least one azimuthal viewing angle,
where said half-brightness angle is defined as an angle of a direction inclined with respect to a normal direction of said liquid crystal display panel in which brightness of light emerging from said backlight unit into said liquid crystal display panel becomes 50% of that in said normal direction; and
said isochromatic viewing angle is defined as a range of viewing angles from said normal direction where a following relationship is satisfied:

$$\sqrt{(\Delta xr)^2 + (\Delta yr)^2} < 0.125 \times \sqrt{(xr - xw)^2 + (yr - yw)^2}$$

$$\sqrt{(\Delta xg)^2 + (\Delta yg)^2} < 0.125 \times \sqrt{(xg - xw)^2 + (yg - yw)^2}$$

$$\sqrt{(\Delta xb)^2 + (\Delta yb)^2} < 0.125 \times \sqrt{(xb - xw)^2 + (yb - yw)^2},$$

where (xr, yr), (xg, yg), (xb, yb), and (xw, yw) are chromaticity coordinates of said primary red, said primary green, said primary blue and white displayed on said liquid crystal display panel, viewed in said normal direction, respectively;
$\Delta xr$, $\Delta yr$ are shifts in x, y coordinates of said primary red viewed at off-normal angles, respectively, $\Delta xg$, $\Delta yg$ are shifts in x, y coordinates of said primary green viewed at off-normal angles, respectively, and $\Delta xb$, $\Delta yb$ are shifts in x, y coordinates of said primary blue viewed at off-normal angles, respectively, with respect to corresponding coordinates of corresponding primary colors of said primary red, said primary green and said primary blue viewed in said normal direction, on the CIE 1931 chormaticity diagram.

7. A color liquid crystal display device according to claim 6, wherein said isochromatic viewing angle is more than twice a maximum difference in viewing angle, said maximum difference in viewing angle being defined as an angle viewing a corner of said liquid crystal display panel with respect a normal to a center of said liquid crystal display panel at a predetermined viewing distance.

8. A color liquid crystal display device according to claim 6, wherein a corrugate sheet having a light collection property is interposed between said liquid crystal display panel and said backlight unit.

9. A color liquid crystal display device according to claim 6, wherein a corrugate sheet having a prismatic outer surface on a side thereof of said liquid crystal display panel is interposed between said liquid crystal display panel and said backlight unit, a vertex angle of said prismatic outer surface being 100° or less.

10. A color liquid crystal display device according to claim 6, wherein two corrugate sheets are interposed between said liquid crystal display panel and said backlight unit; one of said two corrugate sheets collecting light in a horizontal direction of said color liquid crystal display device, the other of said two corrugate sheets collecting light in a vertical direction of said color liquid crystal display device and a collection efficiency of said other of said two corrugate sheets being higher than that of said one of said two corrugate sheets.

11. A color liquid crystal display device according to claim 6, wherein a corrugate sheet is interposed between said liquid crystal display panel and said backlight unit, and a light diffusing sheet is interposed between said liquid crystal display panel and said corrugate sheet.

12. A color liquid crystal display device comprising:
a liquid crystal display panel including a substrate, a liquid crystal layer, and color filters corresponding to primary red, primary green and primary blue; and
a backlight unit disposed behind said liquid crystal display panel;
wherein said liquid crystal display panel is provided with a display electrode and a reference electrode in each pixel region on a surface of the substrate on a side thereof in contact with the liquid crystal layer,
an electric field substantially parallel to said substrate is generated in said liquid crystal layer by application of a voltage between said display electrode and said reference electrode, thereby modulating transmission of light through said liquid crystal layer,
said display electrode being supplied with a video signal from a video signal line via a switching element in said pixel region adapted to be switched on by a scanning signal from a scanning signal line, and said reference electrode being supplied with a reference signal from a reference line, and
wherein said color liquid crystal display device satisfies a relationship of an isochromatic viewing angle>a half-brightness angle, for at least one azimuthal viewing angle,
where said half-brightness angle is defined as an angle of a direction inclined with respect to a normal direction of said liquid crystal display panel in which brightness of light emerging from said backlight unit into said liquid crystal display panel becomes 50% of that in said normal direction; and
said isochromatic viewing angle is defined as a range of viewing angles from said normal direction where an absolute shift in an x coordinate of said primary red viewed at off-normal angles is not greater than 0.0314, an absolute shift in a y coordinate of said primary green viewed at off-normal angles is not greater than 0.0273, and an absolute shift in an x coordinate of said primary blue viewed at off-normal angles is not greater than 0.0177, with respect to corresponding coordinates of corresponding primary colors of said primary red, said primary green and said primary blue viewed in said normal direction, on the CIE 1931 chromaticity diagram.

13. A color liquid crystal display device according to claim 12, wherein said isochromatic viewing angle is more than twice a maximum difference in viewing angle, said maximum difference in viewing angle being defined as an angle viewing a corner of said liquid crystal display panel with respect to a normal to a center of said liquid crystal display panel at a predetermined viewing distance.

14. A color liquid crystal display device according to claim 12, wherein a corrugate sheet having a light collection property is interposed between said liquid crystal display panel and said backlight unit.

15. A color liquid crystal display device according to claim 12, wherein a corrugate sheet having a prismatic outer surface on a side thereof of said liquid crystal display panel is interposed between said liquid crystal display panel and said backlight unit, a vertex angle of said prismatic outer surface being 100° or less.

16. A color liquid crystal display device according to claim 12, two corrugate sheets are interposed between said liquid crystal display panel and said backlight unit; one of said two corrugate sheets collecting light in a horizontal direction of said color liquid crystal display device, the other of said two corrugate sheets collecting light in a vertical direction of said color liquid crystal display device and a collection efficiency of said other of said two corrugate sheets being higher than that of said one of said two corrugate sheets.

17. A color liquid crystal display device according to claim 12, wherein a corrugate sheet is interposed between said liquid crystal display panel and said backlight unit, and a light diffusing sheet is interposed between said liquid crystal display panel and said corrugate sheet.

* * * * *